United States Patent
O'Rourke et al.

(10) Patent No.: US 8,413,237 B2
(45) Date of Patent: Apr. 2, 2013

(54) METHODS OF SIMULATING VULNERABILITY

(75) Inventors: Paul F. O'Rourke, Basking Ridge, NJ (US); Robert J. Shanley, Morristown, NJ (US)

(73) Assignee: Alcatel Lucent, Paris (FR)

( * ) Notice: Subject to any disclaimer, the term of this patent is extended or adjusted under 35 U.S.C. 154(b) by 1270 days.

(21) Appl. No.: 11/584,598

(22) Filed: Oct. 23, 2006

(65) Prior Publication Data

US 2008/0098479 A1    Apr. 24, 2008

(51) Int. Cl.
   H04L 29/06    (2006.01)
(52) U.S. Cl. .............. 726/23; 726/24; 726/25
(58) Field of Classification Search ............ 726/23, 726/24, 25
   See application file for complete search history.

(56) References Cited

U.S. PATENT DOCUMENTS

| | | | |
|---|---|---|---|
| 7,013,395 B1 * | 3/2006 | Swiler et al. | 726/25 |
| 7,096,502 B1 * | 8/2006 | Fox et al. | 726/25 |
| 7,194,769 B2 * | 3/2007 | Lippmann et al. | 726/25 |
| 7,315,801 B1 * | 1/2008 | Dowd et al. | 703/13 |
| 7,437,766 B2 * | 10/2008 | Cohen et al. | 726/26 |
| 7,620,985 B1 * | 11/2009 | Bush et al. | 726/22 |
| 2003/0046583 A1 * | 3/2003 | Goldman et al. | 713/201 |
| 2003/0051163 A1 * | 3/2003 | Bidaud | 713/201 |
| 2003/0182582 A1 * | 9/2003 | Park et al. | 713/201 |
| 2005/0193430 A1 * | 9/2005 | Cohen et al. | 726/25 |
| 2006/0021034 A1 * | 1/2006 | Cook | 726/25 |
| 2006/0048026 A1 * | 3/2006 | Fine et al. | 714/724 |
| 2006/0218640 A1 * | 9/2006 | Lotem et al. | 726/25 |
| 2006/0265324 A1 * | 11/2006 | Leclerc et al. | 705/38 |
| 2006/0265751 A1 * | 11/2006 | Cosquer et al. | 726/25 |
| 2006/0281056 A1 * | 12/2006 | Ouderkirk et al. | 434/118 |
| 2007/0067846 A1 * | 3/2007 | McFarlane et al. | 726/25 |
| 2007/0067848 A1 * | 3/2007 | Gustave et al. | 726/25 |
| 2007/0168727 A1 * | 7/2007 | Fournier et al. | 714/25 |
| 2007/0169199 A1 * | 7/2007 | Quinnell et al. | 726/25 |
| 2008/0046393 A1 * | 2/2008 | Jajodia et al. | 706/50 |
| 2008/0209566 A1 * | 8/2008 | Ziv | 726/25 |

OTHER PUBLICATIONS

Sheyner, Oleg et al., "Automated Generation and Analysis of Attack Graphs," Proceedings of the 2002 IEEE Symposium of Security and Privacy, 2002, pp. 1-12.*

Ingols, Kyle et al., "Practical Attack Graph Generation for Network Defence," 2006, pp. 1-10.*

Philips, Cynthia et al., "A Graph-Based System for Network-Vulnerability Analysis," ACM, 1999, pp. 71-79.*

* cited by examiner

*Primary Examiner* — Michael Pyzocha
(74) *Attorney, Agent, or Firm* — Harness, Dickey & Pierce

(57) ABSTRACT

Methods of simulating vulnerability are provided. In an example, multi-stage vulnerability across multiple systems may be simulated by first simulating a probing of at least one intermediate entity, the at least one intermediate entity connected to a target system, second simulating a probing of the target system if the first simulated probing is successful and generating an attack graph based on the results of the first and second simulating steps. In another example, multi-system vulnerability may be simulated by receiving a plurality of attributes associated with vulnerabilities of a plurality of systems within a network, the plurality of systems including at least one target system and generating an attack graph including one or more attack chains based at least in part on the received plurality of attributes. In another example, system (e.g., single-system) vulnerability may be simulated by first simulating whether vulnerabilities exploited from a first system state cause a transition to a second system state, the second system state having a higher-privilege level than the first system state within a target system and generating an attack graph based at least in part on the results of the simulation.

14 Claims, 8 Drawing Sheets

METHODS OF SIMULATING VULNERABILITY

STATEMENT REGARDING FEDERALLY SPONSORED RESEARCH OR DEVELOPMENT

This invention was made with Government support. The Government has certain rights in this invention.

BACKGROUND OF THE INVENTION

1. Field of the Invention

Example embodiments of the present invention relate generally to methods of simulating vulnerability, and, more particularly, to methods of analyzing simulating system and/or multi-system vulnerability.

2. Description of the Related Art

Multi-stage attacks are often the most effective way for an attacker to compromise a system. Multi-stage attacks refer to a vulnerability exploitation where an attacker navigates from an initial state to a goal state by exploiting a series of vulnerabilities. An attack chain is the set of vulnerabilities that, when acted upon sequentially, compromise a system.

The simplest attack chain is a single exploit of a vulnerability that results in a transition to the attacker's goal state. For example, if an attacker is directly connected to a target system, the attacker merely has to compromise the defenses of the target system to achieve the goal state, which is root or administrative privileges on the target system. In a further example, entering an administrator password onto a computer running a Windows Operating System (OS) may demonstrate a single step where an attacker may directly transition to the goal state.

Often, however, in order to reach the goal state, more than one vulnerability must be exploited, and thus an attack chain will typically contain a series of "chained" attacks. Furthermore, even if the goal state is reachable through a single attack, a chain of attacks is likely to make the intrusion stealthier because of difficulties for security systems to piece together the different vulnerability exploitations so as to recognize the attacker's true target, or in some cases, to even recognize that the multiple exploitations constitute an attack.

Modern computer systems typically contain many applications and services, many of which are enabled by default. These services may be secure in isolation but their integration and/or interaction can often provide a pathway for an opportunistic attacker. Further, one of the principles of network design is separation of services. The "separation of services" design criteria often result in separate systems providing different services. For example, a first system may provide a file transfer protocol (FTP) service and a second system may provide a mail or Simple Mail Transfer Protocol (SMTP) service.

Aside from partitioning complex organizational systems by services, the services themselves may be further partitioned based on the security level granted to the service user. Users are granted "user-level" privileges, allowing the use of a service in a predefined and controlled manner. However, applications and operating systems also have higher privileged accounts, typically referred to as "admin" or "root", which grant users the ability to modify or configure software in wide-ranging ways. In an example, "admin-level" or "root-level" privileges grant users complete control to operate of a service application or operating system. However, it is understood that the a set of possible privilege-levels is not limited to no privileges, user-level privileges or root-level privileges. Rather, additional privilege levels, for example, associated with privileges greater than user-level but less than root-level, may be granted by a system. For example, a web server may run at a higher privilege level than user-level to facilitate script execution, but at a lower privilege level than root-level to protect the web server from a malicious attack. In another example, an account for a backup operator may grant sufficient privileges to read critical system files, but not to have overwrite or replace such files.

Another well-known concept is that of separate domains or zones within an organization's infrastructure. Many organizations have services for distribution to the general public, as well as separate "internal" services and systems for distribution only to authorized agents of the organization (e.g., a network administrator, etc.). The partitioning of zones to separate such services typically causes at least two zones to be employed within the organization's network. The semi-public or demilitarized zone (DMZ) is an area where an organization will deploy services that are to be accessible from a public zone or Internet. A private zone is where information, systems, and services reside within the organization.

FIG. 1 illustrates a conventional network 100. As shown in FIG. 1, an attacker is positioned within a public zone 20 (e.g., an Internet location). Assume the attacker 10 wishes to infiltrate a target system 55 within a private zone 60 of the network 100. From the perspective of the attacker 10, it will be difficult to directly interact with the target system 55 because the attacker 10 must traverse a DMZ 40, as well as two firewalls 12 and 14. However, the DMZ 40 is typically configured to grant services to users residing within the public zone 20. Accordingly, the attacker 10 may choose to indirectly attack the target system 55 by first breaching the DMZ 40, and then using the attacker's advantageous position within the DMZ 40 to breach the private zone 60. While the attacker 10 may still have difficulty in breaching the security of the private zone 60 from the DMZ 40, the attacker 10 will typically have more success attacking from the DMZ 40 as compared to an attack initiated from the public zone 20.

Even the most simplistic network used by an organization is likely to have at least one router or firewall performing some type of traffic filtering. Accordingly, from the attacker's perspective, it is typically beneficial to use multiple intermediary hosts in route to the ultimate target.

Further, breaking up attacks on targets into a plurality of attacks on intermediate hosts, which eventually lead to the target, can be beneficial for other reasons aside from simply making a potential attack more likely to succeed. For example, a basic offensive strategy in most adversarial situations, both within the context of computer hacking as well as physical reconnaissance, is to inflict harm (e.g., such as data capture) on an enemy without being detected and without having the attacker's actions traceable back to their true origin. In other words, attackers often favor stealth and lack of traceability, even if such considerations lessen the potential harm, over more crippling and yet easily traceable attacks.

Accordingly, an attacker using intermediate hosts increases the difficulty in tracing an attack back to the attacker's origin. Also, if the final intermediary host (e.g., the last device compromised before the target) and the target machine have a "trust" relationship, the attack may be difficult to detect. Thus, even if the target can be directly attacked by the attacker, the attacker may still have incentives for employing a multi-stage attack.

Attack graph generation and analysis is a common tool used to assess system vulnerability. A conventional attack graph includes all possible attack chains for a given system. Attack graphs provide a visual means of analyzing the multiple pathways (i.e., attack chains) to a given goal state. Attack graphs can be used in many domains of information security, from vulnerability assessment and network design to intrusion detection and forensics.

However, attack graphs are typically generated using a labor-intensive process which involves experts analyzing system characteristics (e.g., by analyzing application documentation, source code of operation systems for open-source systems, running diagnostic test software to detect vulnerabilities, etc.) to ascertain vulnerabilities. Thus, analyzing multi-stage attacks with conventional attack graph methodologies increases the labor required exponentially because attack graphs for each system must be generated and then compared/combined to trace an attacker's potential paths to a target. As such, using conventional attack graph generation techniques to generate attack graphs for multi-stage attacks is not practical given that it is a labor-intensive and time-consuming process.

SUMMARY OF THE INVENTION

An example embodiment of the present invention is directed to a method of simulating multi-stage vulnerability across multiple systems, including first simulating a probing of at least one intermediate entity, the at least one intermediate entity connected to a target system, second simulating a probing of the target system if the first simulated probing is successful and generating an attack graph based on the results of the first and second simulating steps.

Another example embodiment of the present invention is directed to a method of simulating multi-system vulnerability, including receiving a plurality of attributes associated with vulnerabilities of a plurality of systems within a network, the plurality of systems including at least one target system and generating an attack graph including one or more attack chains based at least in part on the received plurality of attributes.

Another example embodiment of the present invention is directed to a method of simulating system vulnerability, including first simulating whether vulnerabilities exploited from a first system state cause a transition to a second system state, the second system state having a higher-privilege level than the first system state within a target system and generating an attack graph based at least in part on the results of the simulation.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EXAMPLE EMBODIMENTS

In order to better understand the present invention, first a discussion of attack chains and attack graphs is provided, followed by a description of a conventional single-system attack graph generation process. Then, a single-system attack graph generation process employing a vulnerability analysis tool (VAT) according to an example embodiment of the present invention is described. Finally, a multi-system attack graph generation process (hereinafter referred to as "NET_VAT"), which employs VAT iteratively, will be described in accordance with another example embodiment of the present invention.

Conventional Attack Chains and Attack Graphs

As discussed in the Background of the Invention section, an attack chain is a set of vulnerabilities that, when exploited sequentially, compromise the target system. The result of this compromise is "root access" for the attacker. Root access refers to a state where the attacker obtains root privileges, also known as "administrator" privileges, of a system. An attack graph is a sum or representation of all possible attack chains for a given system. An attack chain is a single path from "no access" to "root access", and an attack graph contains all attack chains for a given system. Accordingly, an attack chain for a given system forms a portion of the attack graph for that same system.

Attack graphs and chains are typically visually embodied as a plurality of nodes ("system states") connected with a plurality of edges (e.g., connectors or transitions) ("exploits"). Nodes represent the state of the target system and edges represent transitions between those states. More specifically, edges illustrate exploitations of vulnerabilities that result in system state changes.

Figure 1:
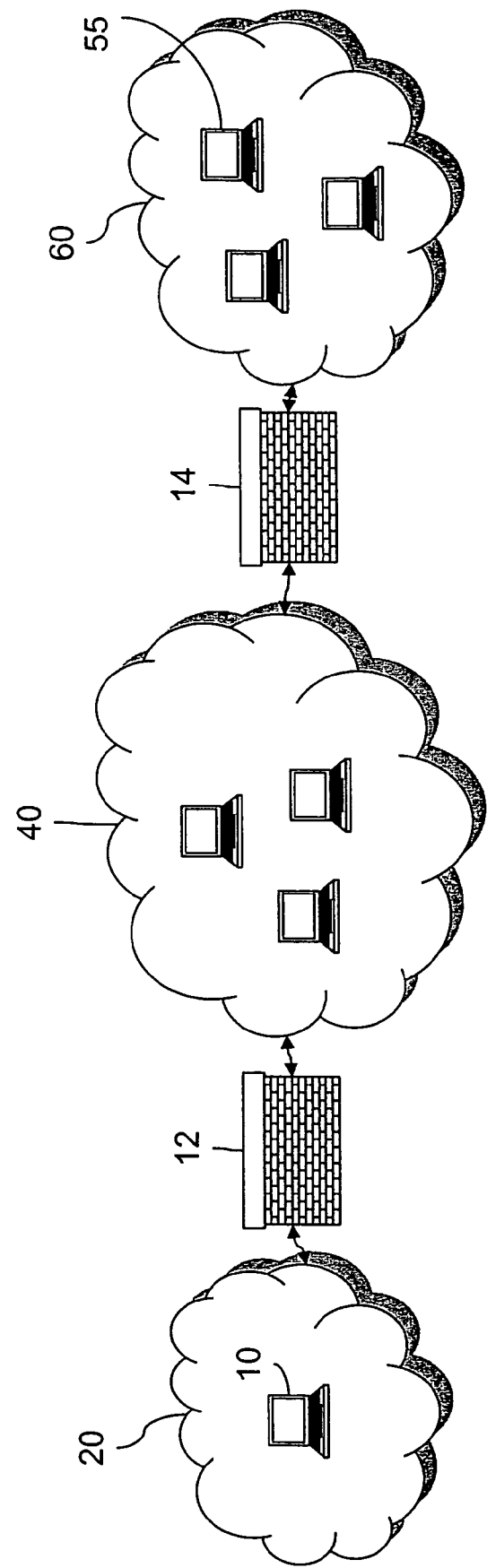
FIG. 1 illustrates a conventional network.
Figure 2:
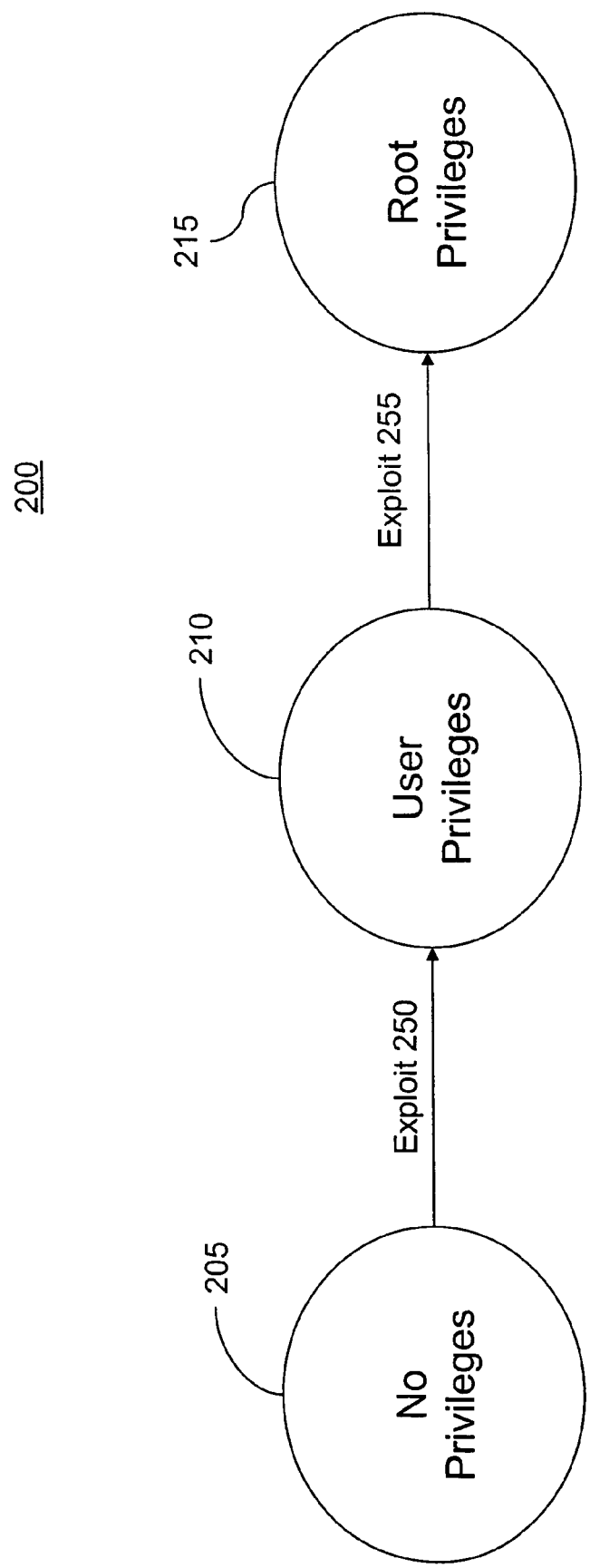
FIG. 2 illustrates a conventional attack chain.

FIG. 2 illustrates a conventional attack chain 200. The attack chain 200 includes system states 205, 210 and 215 and exploits 250 and 255. The system states 205, 210 and 215 represent the three possible states for a target system and the exploits 250 and 255 represent exploited vulnerabilities which cause transitions between the three system states by escalating an attacker's privileges on the target system. As shown, exploit 250 escalates the attacker's privileges from system state 205 ("no privileges") to system state 210 ("user privileges") and exploit 255 escalates the attacker's privileges from system state 210 ("user privileges") to system state 215 ("root privileges"). Accordingly, the attack chain 200 shows a sequential set of actions (i.e., exploits) and their effect on a system (i.e., system state transitions). However, an attack chain only shows one possible path to a compromise of the target system, whereas, in actuality, many such paths may exist. If a system has many potential paths to the attacker's goal state, a single attack chain can not fully describe the vulnerabilities of the target system. An attack graph contains all possible paths or attack chains to root privilege access for the target system, and as such is useful in assessing system vulnerability.

Figure 3:
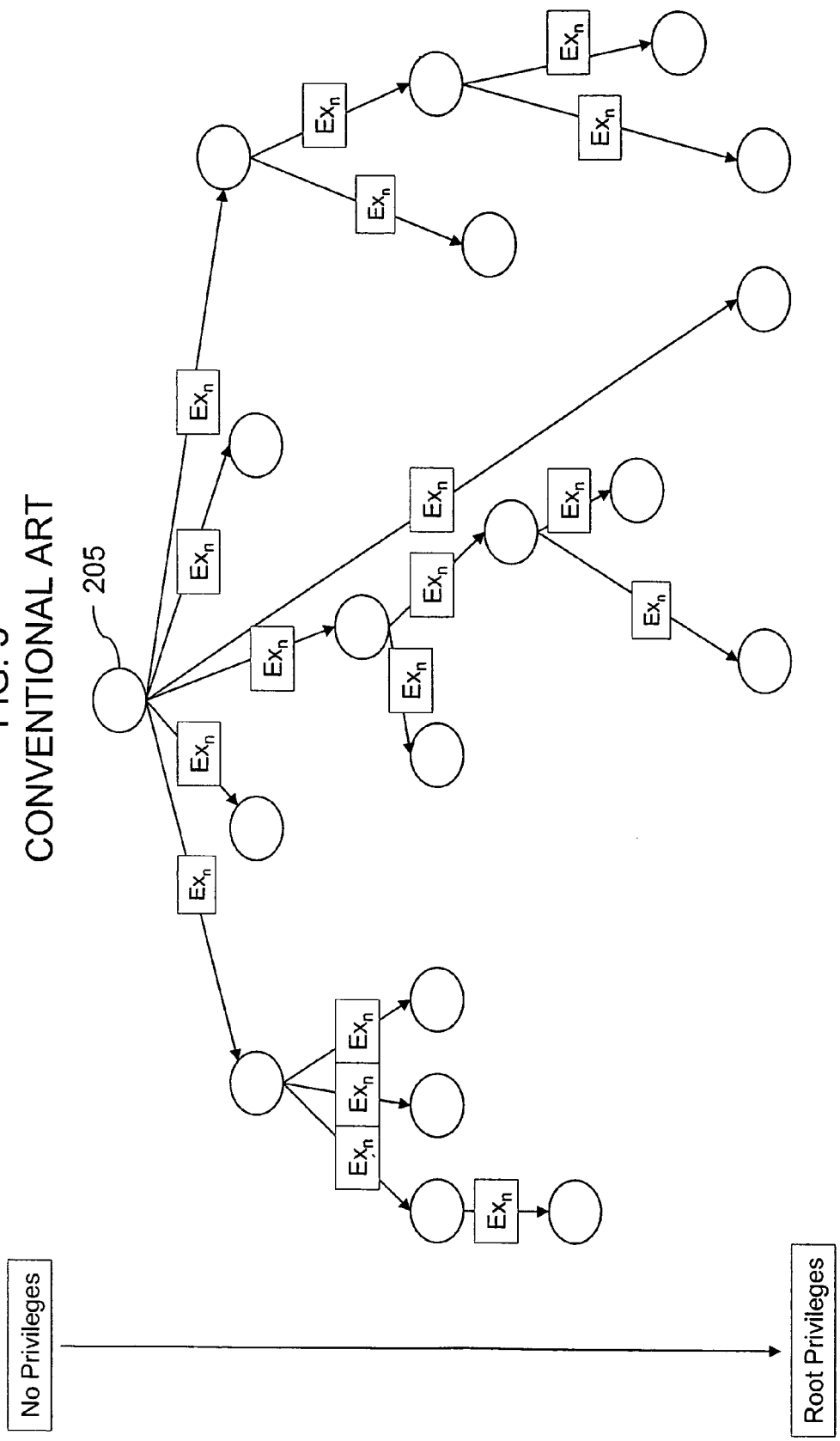
FIG. 3 illustrates a conventional attack graph.

FIG. 3 illustrates a conventional attack graph 300. As shown in FIG. 3, the attack graph 300 includes a plurality of system states and exploits, similar to FIG. 2. However, whereas FIG. 2 illustrated a single attack chain, FIG. 3 illustrates a plurality of attack chains within the attack graph 300.

In FIG. 3, exploits are labeled $Ex_n$ to represent a specific exploit that can be used to change the system state from that represented by the node at the initial vertex to that represented by the node at the terminal vertex. The initial system state 205 indicates a position where the attacker has no privileges on the target system. Other nodes illustrated in FIG. 3 are not labeled for the sake of simplicity, but FIG. 3 is intended to illustrate that, generally, "lower" positioned nodes are associated with system states having higher associated privileges than "higher" nodes. For example, a first system state may grant an attacker execution privileges of a single program and a second system state, positioned lower than the first system state, may grant the attacker execution privileges for a plurality of programs on the target system. Different nodes having the same "depth" indicate system states with different but equally ranked privileges.

FIG. 3 is a relatively simplistic example of an attack graph when compared to a representative attack graph for a complicated system. Also, the complexity of attack graphs depends on the model used to describe the system, which will be described in more detail in the next section with respect to FIG. 4. Generally, the more detailed and complete the model, the more complicated the attack graph will become because, as more information is used in the model definition, the state space possible in the resulting graph also increases.

The Vulnerability Analysis Tool (VAT)

The Vulnerability Analysis Tool (VAT) is an attack graph generation and analysis tool for a single target system. As will now be described, VAT determines the relationship between vulnerabilities and illustrates potential ways such vulnerabilities may be chained together by an attacker to lead to system compromise. VAT is used to generate the vulnerability profile of a system. Below, the VAT attack graph generation process will be described with respect to FIG. 4. Then, the use of the National Vulnerability Database (NVD) within the attack graph generation process of FIG. 4 will be discussed in greater detail.

Attack Graph Generation

Figure 4:
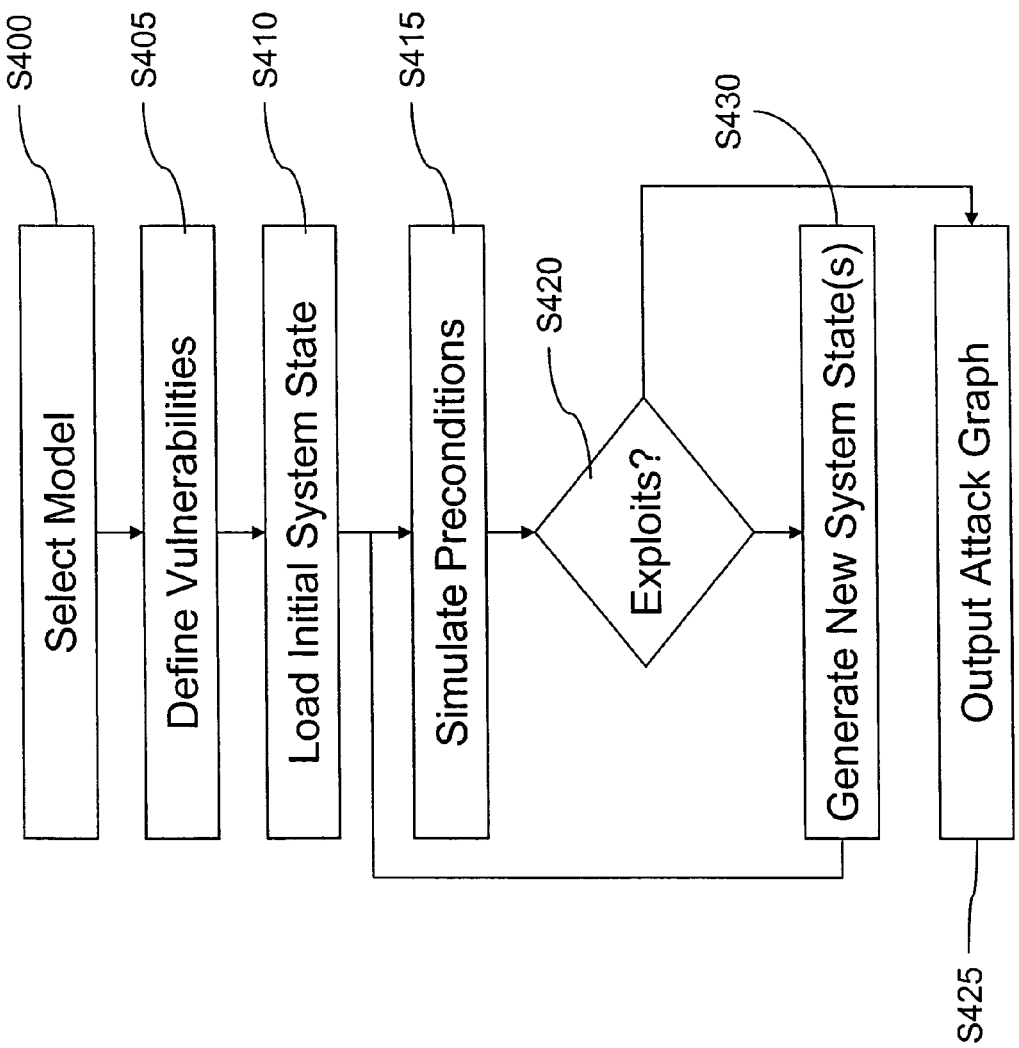
FIG. 4 illustrates an attack graph generation process according to an example embodiment of the present invention.

FIG. 4 illustrates an attack graph generation process according to an example embodiment of the present invention. In step S400 of FIG. 4, a system security analyst enters a high-level model of the target system. The model includes a selection of a number of system attributes such as the operating system applications running on the machine, and the date of the last software patch update.

In step S405 of FIG. 4, the attributes associated with the model selection of step S400 are used to derive vulnerability "preconditions" or triggers which specify the necessary conditions for the exploitation of an associated vulnerability. A vulnerability can only be exploited if all of the preconditions are met, and once the vulnerability is exploited, the current system state transitions to a new state based on the vulnerability "postconditions" (e.g., which is illustrated as a system state transition in the attack graph 300 of FIG. 3). Steps S400 and S405 of FIG. 4 will be described in greater detail later with respect to VAT.

Once the model is defined, the resultant attack graph is generated with a series of automated steps applying propositional logic. The automated steps in the attack graph generation process, which will now be described, are typically performed with expert system shells or symbolic model verifiers, hereinafter referred to as a "simulator". Generally, as will now be described in greater detail with respect to steps S410 to S430, the simulator begins at a safe state or "root node" and then enumerates all possible "unsafe" system states by analyzing the effect of exploits performed at the root node and thereafter any available nodes which are attained via the root node exploits, and so on, until root privileges are gained. The process terminates when all possible attack chains from the root node to the root privilege node are simulated on the target system.

In step S410 of FIG. 4, the simulator loads an initial system state based on the model selected in step S400 and S405 The simulator then determines the preconditions for vulnerability exploits in the initial system state to determine whether there are any exploits that result in a system state transition to a higher-privileged system state in step S415. In step S420, the simulator determines whether any exploits resulting in higher-privilege system states have been discovered. If no exploits are found during step S415, the process terminates at step S425 and outputs the attack graph to the system security analyst; otherwise, the process advances to step S430.

Each exploit results in a number of impacts on the simulated system which, in the attack graph, are represented as a new system state or node. In step S430, a new system state is generated for each sucessful exploit discovered in step S420. The new system state is generated according to the vulnerability postconditions that resulted from the exploit. After the new system states are generated in step S430, the process returns to S415 and the process repeats. In this process, the postconditions of an exploited vulnerability become the vulnerability preconditions for the new system state.

Figure 5:
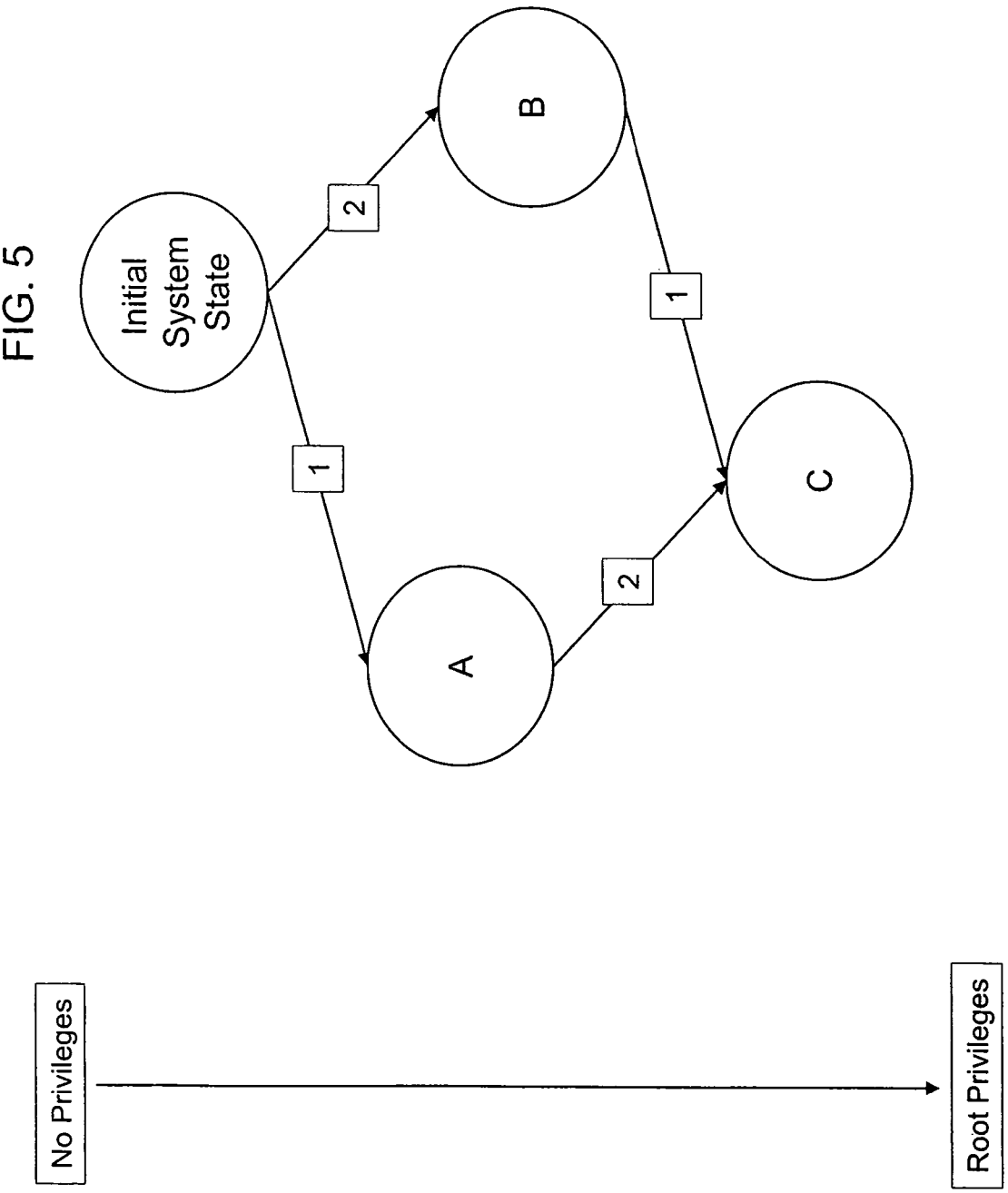
FIG. 5 illustrates an example attack graph.

It is possible that two system states result in the attacker having the same privileges. FIG. 5 illustrates an example attack graph where four (4) exploits result in an attack graph with three (3) "new" nodes (i.e., nodes other than the initial system state). Referring to FIG. 5, if exploits 1 and 2 are possible from the initial system state, it is possible to transition to system states A and B, respectively. If exploit 3 is executed in system state A or exploit 4 is executed in system state B, each of states A and B may transition to a system state C. Accordingly, it is possible that the simulator may discover a greater number of exploits in step S415 than the number of system states generated in step S430. Thus, instead of displaying two distinct system states representing the same privileges, system states having the same privileges are merged for the sake of clarity within the attack graph.

As will now be described in greater detail, steps S400 and S405 of the attack graph generation process of FIG. 4 may be automated with the simulator such that the process of FIG. 4 may be performed much faster than conventional techniques, allowing attack graphs to be used to simulate vulnerabilities of more complex systems. This increase in performance is achieved by employing information retrieved from the NVD.

National Vulnerability Database (NVD)

In the above description of FIG. 4, steps S410 through S430 are automated and performed by a simulator. In an example which will now be described, steps S400 and S405 may also be automated with the simulator through the use of information provided from the NVD.

NVD is not a vulnerability database; rather it indexes information available in CERT advisories, ISS X-Force, Security Focus, NT Bugtraq, Bugtraq, as well as a number of vendor security bulletins. NVD is based on the Common Vulnerabilities and Exposures (CVE) naming standard, which seeks to standardize the names for all well-known computer vulnerabilities and exposures. Vulnerabilities and exposures that are identified and named by the CVE project are described in detail by NVD, which presently uses a large number of attributes to describe each vulnerability included in its index.

NVD information can be downloaded in the form of XML files, which can then be parsed for use in security-related projects.

NVD is useful in security research largely because an analyst has classified each entry according to the standard attributes used to describe vulnerabilities. Presently, the NVD XML files are automatically updated every two hours and include approximately twenty additional vulnerabilities each day. Therefore, NVD provides an up-to-date source for vulnerability information.

In the above discussion of vulnerability analysis and attack graph generation, the importance of defining vulnerabilities in terms of preconditions and postconditions (i.e., the necessary conditions for exploitation and the effects of exploitation) was described in steps S415 through S430 of FIG. 4. By applying NVD, a system security analyst can execute the process of FIG. 4 without having to personally create a definition for each vulnerability included in the model. By automating the attack graph generation process in this manner, the model and subsequent analysis are less constrained by the number of vulnerabilities defined within the system because each of the vulnerabilities in NVD, (e.g., currently over 17,000) can be included, leading to a much more complete and realistic model. Also, aside from saving time, NVD typically includes better and more up-to-date information because vulnerabilities and exposures are published at very high rates (e.g., currently about 20 per day), and it is impractical to expect each vulnerability to be included in a manually maintained vulnerability model.

However, there are some minor disadvantages in employing NVD in place of the conventional "manual" attainment of vulnerability and exploit information. The vulnerabilities described in NVD are typically less detailed than manually handwritten vulnerability definitions used in other attack graph generation processes. In exchange for this minor drawback, the system security analyst is able to more fully automate the process of attack graph generation and to obtain complete attack graphs more quickly.

Modeling Approach

An example of performing automated modeling in accordance with the process of FIG. 4 will now be described in greater detail. The modeling approach herein described allows the simulator to perform vulnerability analysis with less detailed input and in a less computationally intensive manner than conventional attack graph generation methodologies. Modeling assumptions will now be described, followed by a description of the three entities of the VAT model.

The first assumption is that only one target system will be included in the model. The model includes all vulnerabilities that currently have been classified by NVD. The limiting factor, in terms of vulnerabilities, is that only the configuration of the target system is being modeled. The second assumption is that the system state in the model changes monotonically. That is, if the system state changes to one where the attacker has increased privileges, the attacker will not give up these privileges or move back along the attack graph to pursue other points of entry. The third assumption is that the overall model can be represented in simple propositional logic, as will be described in more detail later.

Modeling Entity: Attacker

The attacker is the individual who is exploiting vulnerabilities on a target system. It is assumed that the attacker has perfect knowledge of the vulnerabilities present in NVD. That is, if a system contains one or more vulnerabilities, the attacker is aware of their presence and how they can be exploited. It is also assumed, as described earlier with respect to the second modeling assumption, that the attacker acts monotonically. This means that once the attacker has obtained user-level access to application X, the attacker will not give up these privileges on the way to obtaining his/her goal. Further, the goal of the attacker is assumed to be acquiring root privileges on the target system.

As discussed above with respect to steps S410-S430 of FIG. 4, in the production of the attack graphs, it is assumed that the attacker begins with no privileges (e.g., at a "root node") on the target system and will exploit any vulnerabilities present on the target system (e.g., present at the initial system state and thereafter any subsequently attained system states) in succession to reach the goal state of root privileges. While many privilege levels in a given system may exist, three levels of privileges which will be described below are "no privileges", "user privileges" and "root privileges" (not to be confused with "root node", which has no privileges). No privileges imply that the attacker has no authority to demand any services from the target system. User privileges means the attacker has the authority to demand user-level services from the target system. For example, user-level services are typically granted to local users who can directly access the system, or alternatively may be a user who can access the system remotely through an application such as Telnet. Root privileges means that the attacker has full administrative control of the target system, including access to classified information and/or internal operations of the target system.

In the description above, no distinction is made between operating system privileges and application privileges. However, there is a distinction between these system states for which the VAT model may account. As discussed with respect to FIG. 4, the attack graph generation is iterative in order to evaluate all potential preconditions resulting in exploits which may potentially lead to root privileges. Each event on the target system has resulting impacts, and these impacts in turn may create the opportunity for further exploitation. If application and operating system vulnerabilities are treated the same, there only exist three possible states for an attacker (e.g., no privileges, user-privileges and root privileges).

For example, suppose an attacker has gained user-level privileges on a system. The attacker may then exploit any vulnerabilities that require user privileges. However, because a system typically includes many pieces of software, the "user level privilege" denotation may not provide a sufficient level of granularity. For example, the services or applications are all being treated equally, which does not necessarily hold true in real-world operating environments. For example, using these assumptions an attacker could exploit a vulnerability in application X to gain user privileges and then exploit a vulnerability in application Y to escalate privileges from user privileges to root privileges. However, the problem with this scenario is that the vulnerability in application X led to user privileges in application X only, and not user privileges in all applications (e.g., application Y) present on the system. Thus, if the attacker has no privileges in application Y, the attack chain described above is impossible.

Therefore, an additional assumption is made in the VAT model; namely, every software package (e.g., the operating system, a single application, etc.) is treated independently in terms of privileges. Thus, if an attacker is able to obtain user privileges in application X, the attacker will then be able to exploit any application X vulnerabilities that have user-level access as a precondition, assuming all other preconditions are also satisfied. For example, an attacker with user-level privileges to MySQL can exploit any MySQL vulnerabilities. Similarly, if an attacker has user-level access to the operating system, the attacker can exploit any vulnerabilities that exist in that operating system. Therefore the number of possible states may, at least in some instances, be much greater than three. Typically, the number of possible privilege states is based on characteristics of the operating system and/or a number of software applications running on the target system.

Modeling Entity: Target System

The target system is the machine upon which the attacker will be pursuing root access. The target system typically includes an operating system and application programs. The operating system and applications are factors related to the number and/or types of vulnerabilities available for exploit on the target system. Another factor determining the number and/or types of vulnerabilities present in the target system is the date the target's software was last updated. In the VAT model, the target system is assumed to have all vulnerabilities in NVD associated with the software it is running (e.g., operating system and applications), except those vulnerabilities that were published before the value entered as the target system's last update date.

Modeling Entity: Vulnerabilities

A vulnerability as used within the context of this application is a system characteristic that can be exploited if the attacker can establish the necessary preconditions, and, when exploited, produces a set of impacts that violate the security policy of the system and result in additional privileges for the attacker. As will now be discussed in greater detail, the presence of vulnerabilities is determined by comparing the target system's attributes with preconditions of vulnerabilities maintained by NVD.

As discussed above, at present, NVD entries contain a large number of attributes that are used to describe each vulnerability. Table 1 (below) lists a non-limiting, example set of NVD fields that may be used to identify and classify vulnerabilities in the generation of attack graphs.

TABLE 1

| Field Name | Description |
| --- | --- |
| Name | This vulnerability's full CVE name (e.g. matches regular expression "(CAN\|CVE)-/d/d/d/d-/d/d/d/d"). |
| Discovered | The date on which this vulnerability was discovered, if available. Dates in NVD XML feeds are formatted using the following mask: yyyy-mm-dd. |
| Published | The date on which this vulnerability was published in NVD. |
| Loss types | Wrapper tag for the types of loss that exploitation of this vulnerability can cause. Each child of this element represents a loss type that is specific to this vulnerability. |
| Sec_prot | Indicates exploitation of this vulnerability can result in a loss of security protection on the target machine. This element's attributes describe the level of security protection that is lost. |
| Admin | Indicates exploitation of this vulnerability can result in the attacker gaining administrative privileges on the target machine. |
| User | Indicates exploitation of this vulnerability can result in the attacker gaining user privileges on the target machine. |
| Other | Indicates exploitation of this vulnerability can result in the attacker gaining some other privileges on the target machine. |
| Range | Wrapper tag for tags describing the attack range of this vulnerability. |
| Local | Indicates that this vulnerability can be exploited by an attacker with local access to the machine. This includes remote terminal access through telnet, SSH, etc. |
| Remote | Indicates that this vulnerability can be exploited by an attacker with remote access to the machine and is specifically not authenticated on the target machine. |
| User_init | Indicates that this vulnerability requires a user on the target computer to access the attacker (i.e. through clicking a malicious hyperlink). |
| Vuln_soft | Wrapper tag for a list of software products that are susceptible to this vulnerability. |
| Prod | Names a product that is susceptible to this vulnerability and serves as a wrapper tag for the versions of this product that are specifically affected. |
| Name | The name of this product. |
| Vendor | The name of this product's vendor. |
| Version | Gives a version number of this product that is susceptible to this vulnerability. |
| Num | A version number of this product that is susceptible to this vulnerability. |

In order to produce attack chains (e.g., which collectively form the attack graph), a simulator uses the fields in Table 1 (above) to perform two primary tasks. The first task is to determine whether a vulnerability in NVD can be assumed to be present on a system with a set of known attributes. The second task is to determine if the vulnerabilities that are present on a system can be exploited in succession to move the attacker closer to his goal (i.e., root privileges on the target system). In order to perform the first and second tasks, the vulnerability exploits are classified according to their impacts.

Figure 6:
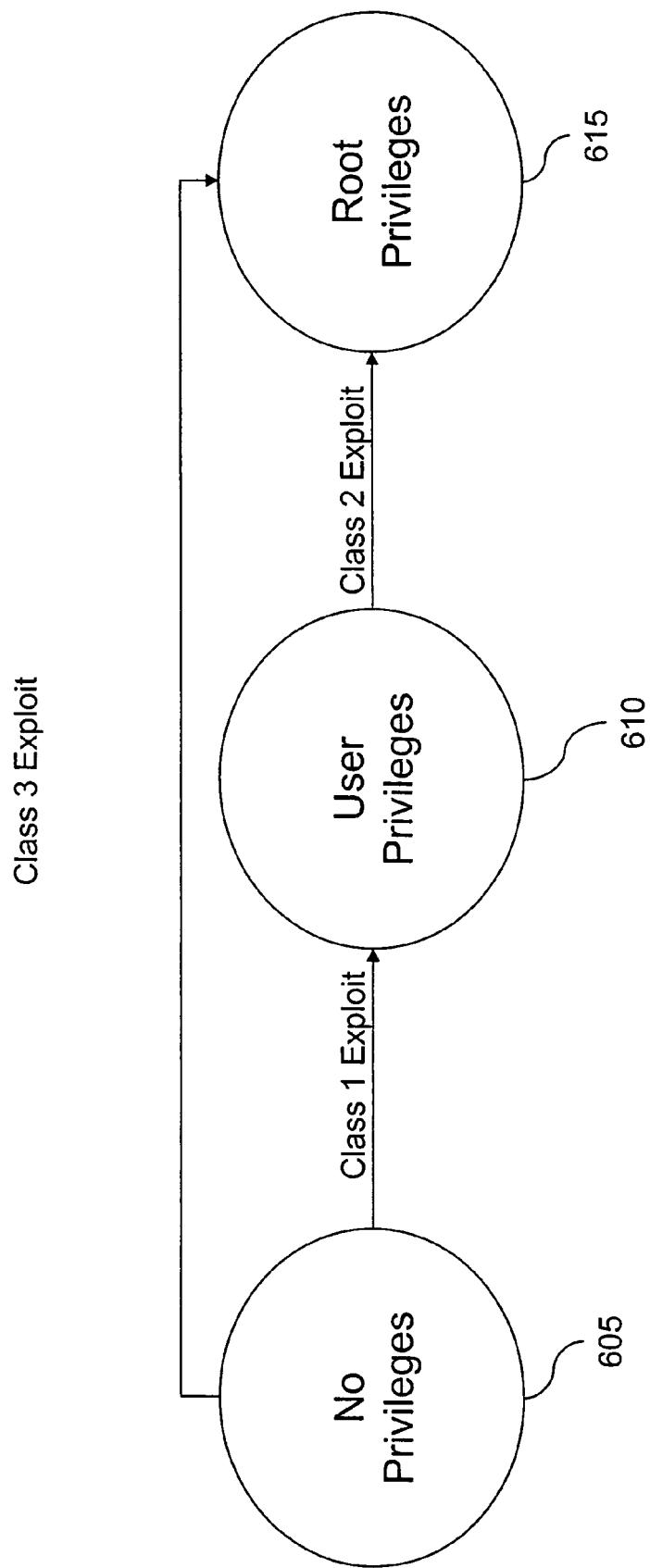
FIG. 6 illustrates an example set of exploit classes available to an attacker.

FIG. 6 illustrates an example set of exploit classes available to an attacker. As shown in FIG. 6, exploit classes are characterized by their starting and ending system states, where the system state is an indicator of the attacker's privilege level on the target system. In FIG. 6, initial system state 605, intermediate system state 610 and target system state 615 are illustrated. Also illustrated are exploit classes 1, 2 and 3. Exploits belonging to exploit class 1 cause a transition from the initial system state 605 to the intermediate system state 610, exploits belonging to exploit class 2 cause a transition from the intermediate system state 610 to the target system state 615, and exploits belonging to exploit class 3 cause a transition from the initial system state 605 directly to the target system state 615 (e.g., without requiring a transition to the intermediate system state 610).

In FIG. 6, given that three states exist and the attacker's privilege level increases monotonically, there can only be three possible classes of exploits. However, the number of possible exploit classes scales with the number of possible states (e.g., user level privileges in an application).

Assuming that the exploit classes are identified in accordance with FIG. 6 and the major fields of NVD vulnerabilities are known, the simulator uses the NVD attributes to classify vulnerabilities to enumerate attack chains and to generate attack graphs.

The target system modeling may be applied within the process of FIG. 4 to more fully automate the attack graph generation process, thereby resulting in a much faster and more accurate generation of attack graphs. The resultant increase in speed and accuracy may allow system security analysts to more quickly assess potential trouble areas within target systems.

"Acrobat Reader" and the "Version" NVD field is "7.0". Within Table 2, the "Vendor", "Product" and "Version" NVD fields are represented for individual nodes with variables "node.vendor", "node.product" and "node.version", respectively;

"Publish_Date" refers to an NVD field storing a publishing date for the vulnerability within the NVD (e.g., in a format of YYYY-MM-DD). The "Publish_Date" NVD field is a time entry which is compared with a "Node.Update_Date" NVD parameter during execution of the process of FIG. 4. During the process of FIG. 4, the "Publish_Date" NVD field is used to generate a Boolean value based on the comparison between the "Publish_Date" and the "Node.Update_Date". The Boolean value indicates whether the vulnerability is assumed to exist for an evaluated node or system. For example, if the "Publish_Date" NVD field is greater (i.e., later than) than the "Node.Update_Date" NVD parameter, the vulnerability is assumed to be present on the node (e.g., because the node has not updated since the vulnerability was discovered). Accordingly, a first Boolean value (e.g., "1") is generated to indicate the results of the comparison. Alternatively, if the "Publish_Date" NVD field is not greater than the "Node.Update_Date" NVD parameter, the vulnerability is assumed not to be present on the node, and a second Boolean value (e.g., "0") is generated to indicate the results of the comparison;

"Range" and "Privilege_Required" NVD fields represent requisite preconditions for the vulnerability. Because Table 2 is a simplified example and assumes the three above-described classes, the possible values for the "Range" NVD field are "remote" and "local" and the possible values for the "Privilege_Required" NVD field are "n/a" and "user/other". With respect to the "Privilege_Required" NVD field, "n/a" means no privileges on the target system are required to exploit the vulnerability and "user/level" means user level privileges are required to exploit the vulnerability on the target system. With respect to the "Range" NVD field,

TABLE 2

| | Attack Classes | | |
|---|---|---|---|
| NVDFields | Class 1 Exploits | Class 2 Exploits | Class 3 Exploits |
| Vendor | node.vendor | node.vendor | node.vendor |
| Product | node.product | node.product | node.product |
| Version | node.version | node.version | node.version |
| Publish_Date | >node.update_date | >node.update_date | >node.update_date |
| Range | remote | local | remote |
| Loss_Type | user/other | admin | admin |
| Privilege_Required | n/a | user/other | n/a |

Table 2 (above) shows a representative NVD field template for each of class exploits 1, 2 and 3. Each vulnerability or exploit stored within the NVD is stored as shown in Table 2. The particular class exploit to which each vulnerability belongs is implicitly defined by the "Range", "Loss_Type" and "Privilege_Required" NVD fields, as will now be described in greater detail. The NVD fields for each of class exploits 1, 2 and 3 are defined as follows:

"Vendor", "Product" and "Version", or "VPV", refers to information identifying a particular software application or operating system. In an example of a VPV entry for an operating system (OS) such as Microsoft Windows XP Service Pack 2, the "Vendor" NVD field is "Microsoft", the "Product" NVD field is "Windows XP" and the "Version" NVD field is "Service Pack 2". In another example of a VPV entry for a software application such as Adobe Acrobat Reader 7.0, the "Vendor" NVD field is "Adobe", the "Product" NVD field is "remote" means an attack can remotely exploit the vulnerability (e.g., from a public zone or Internet) and "local" means an attacker must have some previously exploited privileges on the target system to exploit the vulnerability. Accordingly, as shown in Table 2, the "Range" NVD field parameter equals "remote" for class 1 exploits and class 3 exploits and equals "local" for class 2 exploits. The "Privilege_Required" NVD field parameter equals "n/a" for class 1 exploits and class 3 exploits, and equals "user/other" for class 2 exploits. Again, the "Range" and "Privilege_Required" NVD fields may include additional values in more complex systems with additional exploit classes; and "Loss_Type" NVD field represents the postcondition if the vulnerability is exploited. Within the simplified class assumptions of Table 2, the "Loss_Type" NVD field can equal "user/level", meaning user-level privileges, or "admin", meaning root-privileges. Accordingly, the "Loss_Type" NVD field equals "user/other" for class 1 exploits and "admin" for class 2 exploits and class 3 exploits.

Network Vulnerability Analysis Tool (NET_VAT)

As has been previously discussed, VAT is limited to attack graph generation for individual target systems. In other words, the attack graphs generated in accordance with VAT represent, from the attacker's perspective, the steps or exploits necessary to achieve root privileges on a single target system. However, it is relatively rare that an attacker will immediately have either direct or indirect access to privileges within the target system. In other words, the attacker has to "work his way up" from a starting point (e.g., within a public zone) through a series of systems before finding and exploiting a system through which the attacker may probe and attack the target system.

Accordingly, network VAT (NET_VAT), which will now be described, is directed to generating multi-system or multi-network attack graphs.

NET_VAT Modeling

As discussed above, the VAT model included, as entities, (1) the attacker, (2) the target system and (3) the vulnerabilities. These three modeling entities are described above with respect to VAT and will not be described further for the sake of brevity. The model used in VAT is the basis for the model used in NET_VAT, but NET_VAT includes additional modeling entities, as will now be described. The additional entities used by NET_VAT include (4) intermediary hosts, (5) network zones and (6) the network.

The network zone is a characteristic of an intermediary host. That is, an intermediary host exists within a given network zone. The network includes one or more network zones, each of which contains one or more intermediary hosts.

Figure 7:
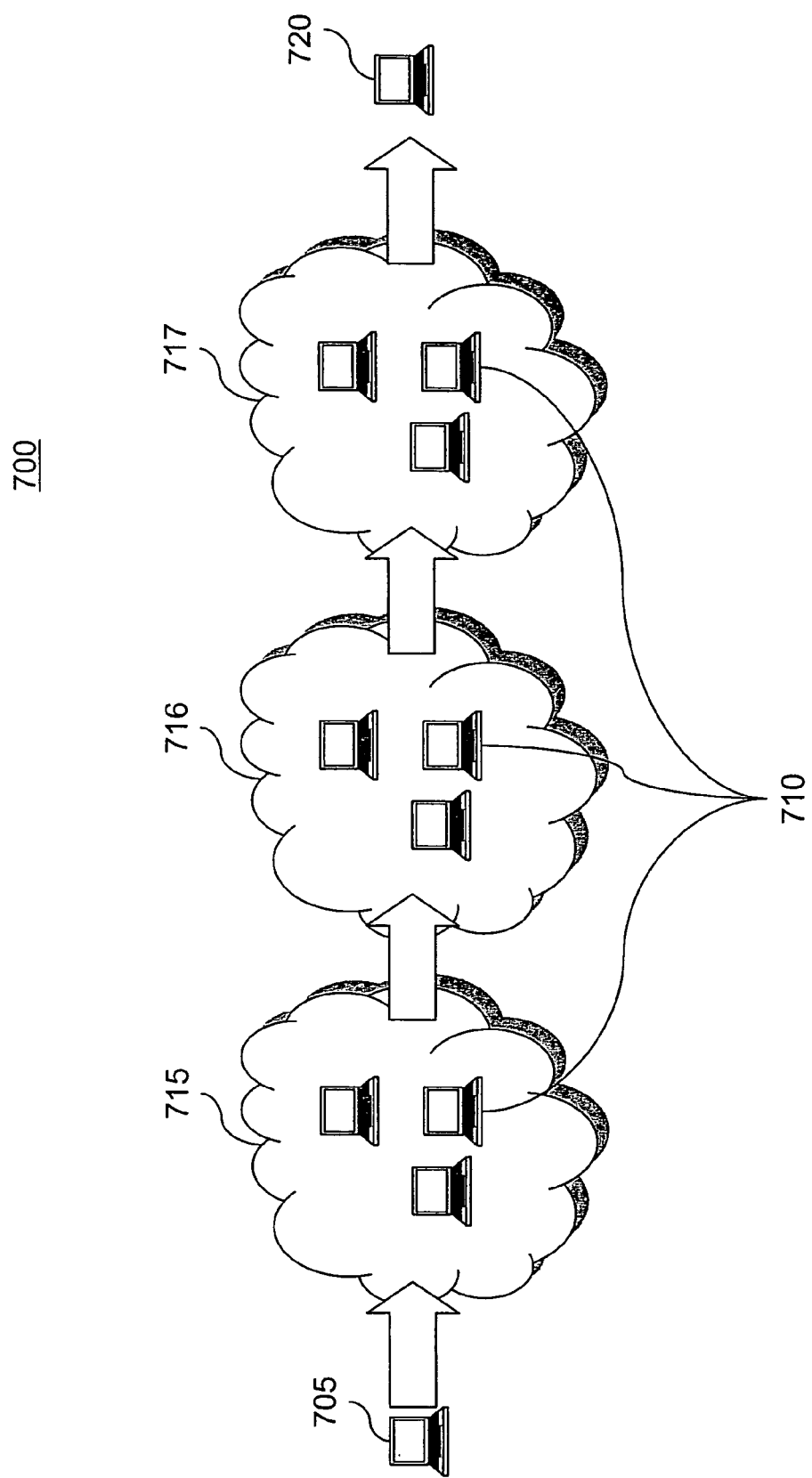
FIG. 7 illustrates a network according to an example embodiment of the present invention.

FIG. 7 illustrates a network 700 showing the relationship between an attacker 705, intermediary hosts 710, network zones 715, 716 and 717, and a target system 720 according to an example embodiment of the present invention. For convenience, we will use a single reference number, 710, to refer to any of the intermediary hosts in any of the network zones 715, 716 and 717.

Referring to FIG. 7, in order to reach the target system 720, the attacker 705 must proceed through a series of network zones 715, 716, and 717 and hosts 710 in each of these zones. It is assumed that the attacker 705 can only communicate with intermediary hosts 710 residing in an adjacent network zone (e.g., network zone 715, 716, 717, etc.). Accordingly, the attacker 705 can initially only probe/attack intermediary hosts 710 in the first network zone 715. If the attacker 705 is able to obtain root privileges on one of the intermediary hosts 710 in the first network zone 715, the attacker 705 may proceed to a next network zone 716, and so on, until eventually achieving root privileges at the target system 720, which completes the attack chain. In general, if there are n network zones in the network 700, each containing m intermediary hosts 710, the attacker 705 must compromise at least one of the m intermediary hosts in each network zone 1 through n before launching an attack on the target system 720.

Figure 8:
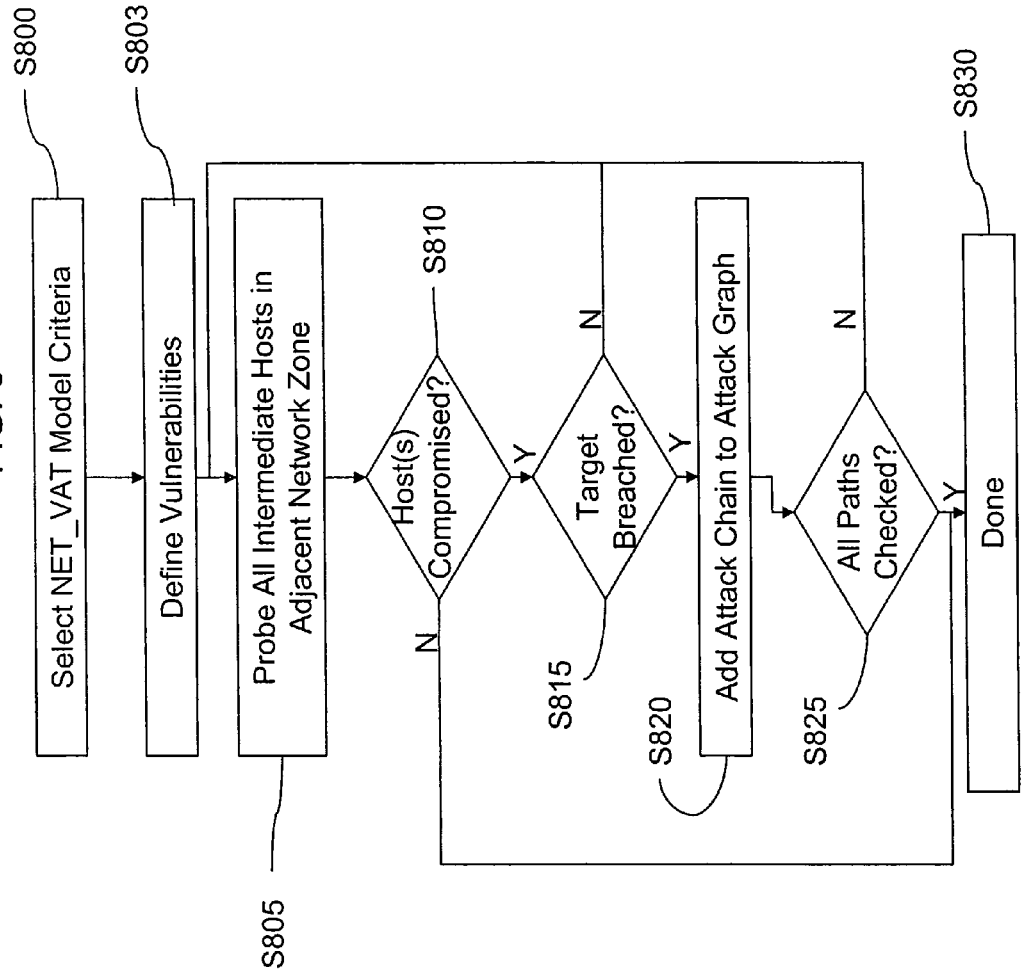
FIG. 8 illustrates a multi-stage attack graph generation process according to another example embodiment of the present invention.

FIG. 8 illustrates a multi-stage attack graph generation process according to another example embodiment of the present invention. Below, the example embodiment of FIG. 8 is described as being performed within the network 700 of FIG. 7. However, it is understood that other example embodiments may perform multi-stage attack graph generation on any network(s), and as such the example process of FIG. 8 is not limited to the network 700 of FIG. 7.

In step S800, a network security analyst selects the NET_VAT modeling criteria as described in detail above. In this example, the network analyst selects the NET_VAT modeling entities (e.g., network, network zones, intermediary hosts, attacker, target system, etc.) as illustrated in FIG. 7 such that the network analyst selects the network 700, the network zones 715, 716 and 717, the intermediary hosts 710 within each of the network zones 715, 716 and 717, the attacker 705, and the target system 720. The vulnerabilities associated with each of the above-listed entities are retrieved from the NVD in accordance with protocols described earlier in this application.

After loading the NET_VAT modeling criteria within a software application (e.g., programmed in Java, C++, etc.) (hereinafter referred to as "simulator") designed to automate the generation of multi-stage attack graphs, the network security analyst runs the simulator, which performs the remainder of the steps illustrated in FIG. 8.

In step S803 of FIG. 8, the entities and attributes associated with the model selection of step S800 are used to derive vulnerability "preconditions" or triggers which are necessary conditions for exploiting the vulnerability on the system and which result in "post-conditions". A vulnerability can only be exploited if all of the preconditions are met, and once the vulnerability is exploited, the exploit transitions the target system state to the post-condition state.

Accordingly, in step S805, the simulator simulates a probing of all intermediary hosts 710 within a network zone adjacent to a network zone wherein the attacker 705 has root privileges. As shown in FIG. 7, the attacker 705 is within a public zone at the first execution of step S805, and is only adjacent to network zone 715. Thus, each intermediary host 710 within the network zone 715 is "probed" in step S805. The "probing" herein referred to is an attacker's attempt to obtain root privileges on the probed system. The probing of step S805 is simulated by executing the VAT attack graph generation process described with respect to FIG. 4 on each of the intermediary hosts 710, with each iteration of the process of FIG. 4 in step S805 treating an intermediary host 710 as its target system. However, since the true target system is not any of the intermediary hosts 710, the VAT attack graph generation processes executed in step S805 merely constitute a single step towards the attacker's 705 eventual goal of reaching the target system 720.

In step S810, the simulator determines whether one or more of the intermediary hosts 710 within the network zone 715 has been compromised. A host is considered to be "compromised" if the attacker is able to achieve root privileges on the host or hosts, effectively commandeering the host for the attacker's 705 purposes. If the simulator determines that the attacker 705 is not successful in compromising any of the intermediary hosts 710 in the first network zone 715, the process terminates at step S830 and no attack graph is generated because the simulator determines that it is impossible for the attacker 705 to reach the target system 720. Otherwise, if the simulator determines that one or more hosts is compromised, the process advances to step S815.

In step S815, the simulator determines whether the one or more compromised hosts is, in fact, the target system 720. If the simulator determines that the one or more compromised hosts is not the target system 720, the process returns to step S805, where the simulator probes all intermediary hosts 710 in the next intermediary zone accessible through any newly compromised hosts from the previous iteration of step S805. With respect to FIG. 7, this means that each intermediary host 710 within a second network zone 716 is probed under the assumption that any compromised intermediary host 710 within the first network zone 715 grants the attacker 705 access to all intermediary hosts 710 within the "adjacent" second network zone 716. Accordingly, the process of FIG. 8 is "iterative" in that adjacent network zones are successively probed until either (1) the target system is compromised, which completes one or more attack chains, or until (2) an intermediary zone, or the target system 720 itself, blocks or firewalls all of the attacker's 705 attempts to achieve root privileges.

Returning to step S815 of FIG. 8, the process advances to step S820 if the target system 720 is determined to have been compromised during the previous step S805 iteration. All successful attack chains, or series of exploits leading from the attacker's 705 initial position to the root privilege attainment at the target system 720, are added to an attack graph in step S820.

In step S825, the simulator determines whether all possible attack chains from the attacker's 705 initial position within the public zone to the target system 720 have been simulated. If not, the process returns to step S805 to check any remaining preconditions or exploits not previously simulated. Otherwise, if all attack chains have been simulated by the simulator in the process of FIG. 8, the process terminates at step S830 and the resultant attack graph is output to the network security analyst, who may then use the resultant attack graph to critically analyze the vulnerability of all aspects of the network 700, including the target system 720.

Example embodiments of the present invention being thus described, it will be obvious that the same may be varied in many ways. For example, it is understood that the above-described simulated attack graph generation process may be performed on any type of processing system (e.g., a Windows PC, a Linux PC, etc.) and may be compiled with software written in any well-known programming language (e.g., Java, C++, etc.).

Such variations are not to be regarded as a departure from the example embodiments of the invention, and all such modifications are intended to be included within the scope of the invention.

We claim:

1. A method of simulating multi-stage vulnerability across multiple systems, comprising:
   selecting, by a computer processor, models associated with a target system and at least one intermediate entity, the at least one intermediate entity and the target system being associated with different network zones;
   retrieving, by the computer processor, a list of vulnerability attributes based on the selected models from a public vulnerability attributes database;
   determining, by the computer processor, if at least one vulnerability attribute associated with the list of vulnerability attributes is present on the at least one intermediate entity connected to the target system;
   in response to the determining that the at least one vulnerability attribute is present on the at least one intermediate entity, first simulating, by the computer processor, a probing of the at least one intermediate entity;
   second simulating, by the computer processor, a probing of the target system based on the list of vulnerability attributes if the first simulated probing is successful; and
   generating, by the computer processor, an attack graph based on the results of the first and second simulating steps.

2. The method of claim 1, wherein the first and second simulating steps are performed in accordance with selected modeling criteria.

3. The method of claim 2, wherein the selected modeling criteria include a network, at least one network zone within the network, an attacker in communication with the network, the target system connected to the network, at least one intermediary host within each network zone and a list of vulnerability attributes.

4. The method of claim 3, wherein the list of vulnerability attributes is associated with one or more of the network and the at least one intermediate host.

5. The method of claim 1, wherein the attack graph is generated by combining a plurality of attack chains.

6. The method of claim 5, wherein each successful set of first and second simulated probing steps forms one of the plurality of attack chains.

7. The method of claim 5, wherein each of the plurality of attack chains includes a plurality of exploits which lead an attacker from a no privilege position at the target system to a root privilege position at the target system.

8. The method of claim 1, further comprising:
   repeating the first simulating step for each of a plurality of intermediate entities connected to the target system if (i) more than one network zone separates the target system from an attacker or if (ii) the plurality of intermediate entities reside within a single network zone separating the target system from the attacker,
   wherein the second simulating step is only performed if at least one attack chain exists from the attacker to one or more of the plurality of intermediate entities connected to the target system.

9. A method of simulating multi-system vulnerability, comprising:
   selecting, by a computer processor, models associated with a plurality of systems within a network;
   receiving, by the computer processor, a plurality of attributes associated with vulnerabilities of the plurality of systems within the network based on the selected models the plurality of attributes received from a public vulnerability attributes database, the plurality of systems including at least one target system being one of the plurality of systems within the network and at least one other system being one of the plurality of systems within the network system, the at least one target system and the at least one other system being associated with different network zones;
   determining, by the computer processor, if at least one attribute associated with the plurality of attributes is present on the at least one other system; and
   in response to the determining that the at least one attribute is present on the at least one other system, generating, by the computer processor, an attack graph including one or more attack chains.

10. The method of claim 9, wherein each of the attack chains includes a plurality of exploits which, when performed successively, allow an attacker to compromise the target system.

11. A method of simulating system vulnerability, comprising:
   selecting, by a computer processor, models associated with a plurality of systems within a network, the plurality of systems including a target system being one of the plurality of systems within the network and at least one other system being one of the plurality of systems within the network system, the target system and the at least one other system being associated with different network zones;

retrieving, by the computer processor, a list of vulnerability attributes based on the selected models from a public vulnerability attributes database;

determining, by the computer processor, if at least one vulnerability attribute associated with the list of vulnerability attributes is present on the at least one other system; and in response to the determining that the at least one vulnerability attribute is present on the at least one other system, first simulating, by the computer processor, whether vulnerabilities exploited from a first system state cause a transition to a second system state, the second system state having a higher-privilege level than the first system state within the target system and generating, by the computer processor, an attack graph based at least in part on the results of the simulation.

12. The method of claim 11, wherein the exploited vulnerability forms at least a portion of an attack chain if the second state has root privileges within the target system.

13. The method of claim 12, further comprising:
repeating the first simulating step until reaching a system state with higher level privileges than the first state; and
forming an attack chain including each of the exploits causing transitions from the first system state to the system state with root privileges,
wherein the attack graph is generated so as to include the attack chain.

14. The method of claim 11, wherein the vulnerabilities and exploits associated with the system state transitions are based on information received from the National Vulnerability Database.

* * * * *